United States Patent
Hori et al.

(10) Patent No.: US 8,513,868 B2
(45) Date of Patent: Aug. 20, 2013

(54) DISPLAY PANEL, DISPLAY APPARATUS, TELEVISION APPARATUS, AND METHOD OF PRODUCING THE DISPLAY PANEL

(75) Inventors: Atsushi Hori, Hiratsuka (JP); Koji Yamazaki, Ayase (JP); Kinya Kamiguchi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

(21) Appl. No.: 12/768,524

(22) Filed: Apr. 27, 2010

(65) Prior Publication Data
US 2010/0277652 A1 Nov. 4, 2010

(30) Foreign Application Priority Data

Apr. 30, 2009 (JP) ................. 2009-111124

(51) Int. Cl.
*H01J 1/62* (2006.01)
(52) U.S. Cl.
USPC ............................. 313/495; 313/293; 445/24
(58) Field of Classification Search
USPC ................... 348/725, E5.123; 313/235, 495; 345/212; 445/24
See application file for complete search history.

(56) References Cited

U.S. PATENT DOCUMENTS

| | | | |
|---|---|---|---|
| 7,282,852 B2 * | 10/2007 | Tajima et al. | 313/497 |
| 2005/0134161 A1 | 6/2005 | Kitamura | |
| 2005/0285882 A1 | 12/2005 | Shino | |
| 2006/0038486 A1 | 2/2006 | Onishi | |
| 2006/0175955 A1 * | 8/2006 | Kawase | 313/495 |

FOREIGN PATENT DOCUMENTS

| | | |
|---|---|---|
| JP | 2005-203348 A | 7/2005 |
| JP | 2006-011286 A | 1/2006 |
| JP | 2006-059638 A | 3/2006 |
| JP | 2007-109603 A | 4/2007 |
| JP | 2008-108566 A | 5/2008 |
| JP | 2008-305739 A | 12/2008 |

* cited by examiner

*Primary Examiner* — Nimeshkumar Patel
*Assistant Examiner* — Jacob R Stern
(74) *Attorney, Agent, or Firm* — Canon U.S.A., Inc. IP Division (57) ABSTRACT

In a display panel, a conductive member subjected to a prescribed electric potential lower than an anode potential is disposed on a first insulating substrate at a location spaced apart from an anode terminal subjected to the anode potential. An insulating member is disposed on the conductive member such that the insulating member includes a part located closer to the anode terminal than an end, on a side facing the anode terminal, of the conductive member and such that a gap is provided between the part and the first insulating substrate.

14 Claims, 7 Drawing Sheets

DISPLAY PANEL, DISPLAY APPARATUS, TELEVISION APPARATUS, AND METHOD OF PRODUCING THE DISPLAY PANEL

BACKGROUND OF THE INVENTION

1. Field of the Invention

The present invention relates to a display apparatus and a television apparatus using the display panel. Furthermore, the present invention relates to a method of producing the display panel.

2. Description of the Related Art

In a flat-type display panel using cathode luminescence, a rear plate including electron emission devices and a face plate including light emitting materials such as phosphors are disposed such that they oppose each other. A space between the rear plate and the face plate is maintained in vacuum.

An electric field is formed between the rear plate and the face plate to accelerate electrons emitted from the electron emission devices so that the accelerated electrons collide with the light emitting materials. To form the electric field, the face plate has an anode subjected to an anode potential set to be in a range from a few kV to a few ten kV with respect to the ground potential. Note that the electron emission devices are supplied with a voltage of a few to a few ten volts with respect to the ground potential.

In the display apparatus configured in the above-described manner, a discharge can occur between a member subjected to a potential close to the anode potential and a member subjected to a potential lower than the anode potential (more specifically subjected to a potential close to the ground potential).

Japanese Patent Laid-Open No. 2007-109603 discloses a technique in which an electrode subjected to a potential lower than the anode potential is disposed around a terminal via which to provide the anode potential to the anode, and an end, on a side closer to the terminal, of the electrode is covered with a dielectric film.

SUMMARY OF THE INVENTION

According to an aspect of the present invention, there is provided a display panel including a rear plate including a first insulating substrate, an electron emission device disposed on the first insulating substrate, and a wiring connected to the electron emission device, a face plate including a second insulating substrate and an anode that is disposed on the second insulating substrate so as to oppose the electron emission device, an anode terminal extending through the first insulating substrate and electrically connected to the anode, wherein the anode terminal is subjected to an anode potential, a conductive member disposed on the first insulating substrate between the anode terminal and both the electron emission device and the wiring such that the conductive member is spaced apart from the electron emission device, the wiring and the anode terminal, wherein the conductive member is subjected to a prescribed potential lower than the anode potential, and an insulating member disposed between the face plate and the conductive member such that the insulating member is spaced apart from the anode terminal and the insulating member is connected to the conductive member wherein the insulating member includes a part located closer to the anode terminal than the conductive member, and the part and the first substrate are disposed with a gap in between.

Further features of the present invention will become apparent from the following description of exemplary embodiments with reference to the attached drawings.

DESCRIPTION OF THE EMBODIMENTS

Figure 1A:
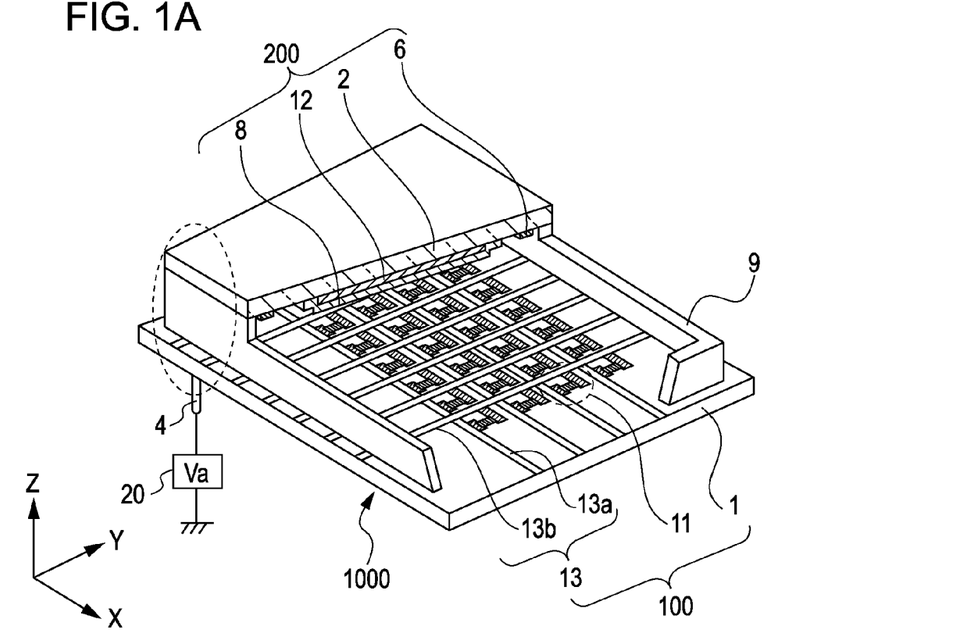
FIG. 1A is a perspective view schematically illustrating a display apparatus according to an embodiment of the present invention.
Figure 1B:
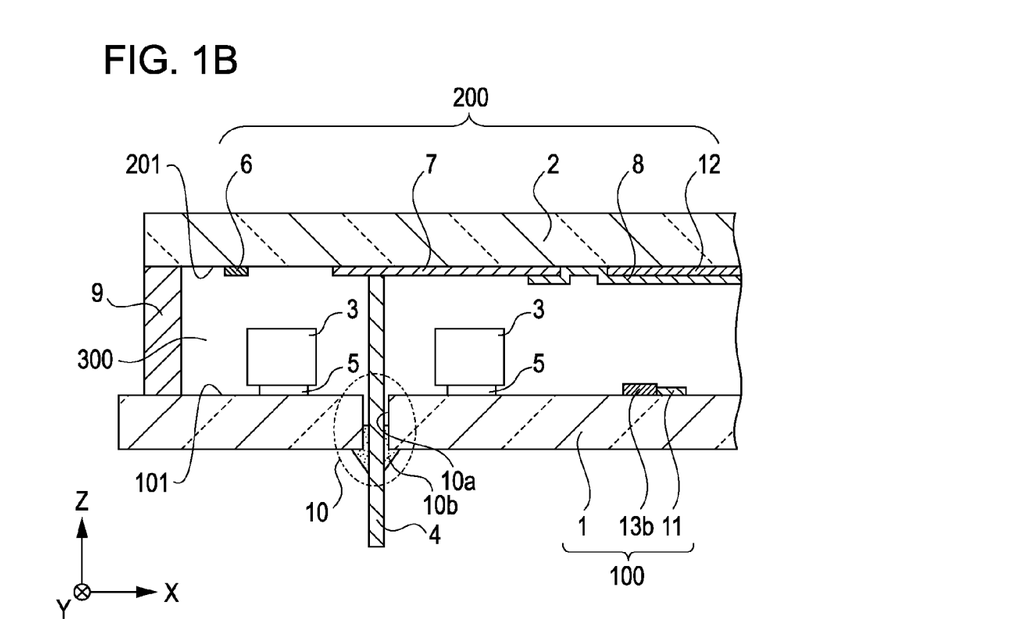
FIG. 1B is a cross-sectional view of a display panel.

Embodiments of the present invention are described below with reference to FIGS. 1 to 3. FIGS. 1A and 1B illustrate an example of a structure of a display apparatus according to an embodiment of the present invention. FIG. 1A is a perspective view (in a partial cutaway form) of the display apparatus according to the present embodiment. FIG. 1B illustrates an example of a characteristic structure of a part according to the embodiment of the present invention. More specifically, FIG. 1B is a cross-sectional view taken in an X-Z plane of FIG. 1A so as to illustrate, in an enlarged manner, a part enclosed by a dashed elliptic line in FIG. 1A. In this figure, X and Y directions are taken along a surface (principal surface) 101 of a first substrate 1, and a Z direction is taken so as to be perpendicular to the surface (principal surface) 101 of the first substrate 1. The display apparatus includes at least a display panel 1000 and an anode potential unit 20.

The display panel 1000 is explained below. The display panel 1000 includes a rear plate 100 and a face plate 200 which are disposed so as to oppose each other. Between the rear plate 100 and the face plate 200, there is a vacuum space (inner space 300) maintained at a pressure lower than the atmospheric pressure. More specifically, an airtight enclosure is formed by the rear plate 100, the face plate 200, and a frame member 9 such that the inner space 300 is formed inside the airtight enclosure and maintained in vacuum. That is, the display panel 1000 is configured in the form of the airtight enclosure (vacuum enclosure) having the inner space 300 maintained in vacuum. The pressure in the inner space 300 may be set at $1 \times 10^{-5}$ Pa or lower.

A spacer (not shown) may be disposed between the rear plate 100 and the face plate 200 to prevent the display panel 1000 from being broken by the pressure difference between the pressure (vacuum) in the inner space 300 and the pressure (atmospheric pressure) in the external space outside the airtight enclosure.

The rear plate 100 includes at least an insulating substrate serving as a first substrate 1, and one or more electron emission devices 11 disposed on a surface 101 of the first substrate 1. Hereinafter, for convenience, the electron emission device 11 refers to a typical electron emission device unless otherwise stated. Note that the surface 101 of the first substrate 1 refers to an inner surface (facing the inner space 300) of the first substrate 1. With regard to being electrically insulating, it is sufficient if the first substrate 1 is electrically insulating at least at its surface. For example, a glass substrate may be employed as the first substrate 1. Alternatively, a glass substrate with an insulating layer formed thereon may be used as the first substrate 1.

In the present embodiment of the invention, "insulating" members are assumed to be greater in volume resistivity than "conductive" members. Practically, the "insulating" members may be formed of a material (insulating material) with a volume resistivity equal to or higher than $10^6$ Ωm. On the other hand, a practically acceptable volume resistivity for the "conductive" members may be equal to or lower than $10^{-3}$ Ωm, and moreover, the volume resistivity thereof may be equal to or lower than $10^{-6}$ Ωm. Examples of conductive members include wirings, electrodes, etc.

As for the electron emission device 11, many types may be employed, such as a conical type (spint type), a surface conduction type, a MIM type, a MIS type, etc. The rear plate 100 further includes wirings 13 that are disposed on the surface 101 of the first substrate 1 such that the wirings 13 are connected to the electron emission device 11. In a case where a plurality of electron emission devices 11 are disposed, wirings 13 may be disposed typically in the form of a matrix wiring system including a plurality of row wirings 13a and a plurality of column wirings 13b.

The face plate 200 includes at least a second substrate 2 that is transparent to light and electrically insulating and an anode 8 disposed on a surface 201 of the second substrate 2. Note that the surface 201 of the second substrate 2 refers to an inner surface (facing the inner space 300) of the second substrate 2. The face plate 200 further includes a light emitting material 12 such as a phosphor or the like disposed on the surface 201 of the second substrate 2. The face plate 200 may also include a guard electrode 6 and/or a connection electrode 7 on the surface 201 of the second substrate 2. Furthermore, a black matrix (not shown) may be disposed on the surface 201 of the second substrate 2.

The anode 8 is a conductive member in the form of a film, a layer, or a plate. For example, the anode 8 may be formed using a thin aluminum film called a back metal film disposed on the light emitting material 12 (on a side of the light emitting material 12, facing the first substrate 1). In a case where the anode 8 is formed using a transparent conductive material such as ITO, ZnO, or the like, the anode 8 may be disposed between the second substrate 2 and the light emitting material 12. In any case, the anode 8 is disposed on the surface 201 of the second substrate 2.

In the present embodiment of the invention, the display panel 1000 is formed such that the anode 8 and the light emitting material 12 of the face plate 200 are located so as to be opposed to the electron emission devices 11 of the rear plate 100, and such that the surface 101 (inner surface) of the first substrate 1 opposes the surface 201 (inner surface) of the second substrate 2.

An anode terminal 4 extends through the first substrate 1 and is electrically connected to the anode 8 in the inner space 300. The anode terminal 4 is subjected to an anode potential Va supplied by an anode potential unit 20 disposed in the display apparatus. Note that in the present invention, the term "being electrically connected" refers to a state in which an electrical connection is achieved by a mutual connection such as bonding, joining, abutting, contacting, etc.

A part enclosed in a dashed-line ellipse in FIG. 1A is described in further detail below. This part in the dashed-line ellipse is located outside a display area, and moreover, may be located in a corner of the display panel 1000 as shown in FIG. 1A. The display area is an area in which the light emitting materials 12 are disposed on the face plate 200 and the electron emission devices 11 are disposed on the rear plate 100.

The anode terminal 4 is a conductive member made of a metal pin, a metal spring, or the like. The anode terminal 4 extends from the outside (outer space) of the display panel 1000 into the inside (inner space 300) of the display panel 1000 via a lead-in part 10 (in a dashed-dotted circle) disposed on the first substrate 1.

The anode 8 is electrically connected to the connection electrode 7, and the connection electrode 7 is electrically connected to the anode terminal 4. That is, the anode 8 is electrically connected to the anode terminal 4 via the connection electrode 7. Alternatively, the anode 8 may be directly connected to the anode terminal 4 without forming the connection electrode 7.

More specifically, in the lead-in part 10, the anode terminal 4 extends through a through-hole 10a formed in the first substrate 1. That is, the anode terminal 4 extends through the first substrate 1 in the above-described manner. Note that in the lead-in part 10, the through-hole 10a is sealed using a sealing member 10b such that the inner space 300 of the display panel 1000 can be maintained in vacuum. Although not illustrated in the figures, an auxiliary member may be disposed in an area close to the lead-in part 10 in order to assist the connection between the anode terminal 4 and the connection electrode 7 and/or an auxiliary member may be disposed to assist the connection of the anode terminal 4 to the first substrate 1. In a case where these auxiliary members are made of a conductive material and are electrically connected to the anode terminal 4 shown in FIG. 1B, the anode terminal 4 can be regarded as including these conductive auxiliary members.

A conductive member 5 is disposed on the surface 101 of the first substrate 1. The details of the conductive member 5 will be described later. An insulating member 3 is disposed on the conductive member 5 (between the conductive member 5 and the rear plate 100). The insulating member 3 is connected at least to the conductive member 5.

The guard electrode 6 is formed on the surface 201 of the second substrate 2 such that the guard electrode 6 is located apart from the connection electrode 7 and the anode 8 and extends around the anode 8. The guard electrode 6 is applied with a prescribed potential (for example, a GND potential) lower than the anode potential of the anode 8.

Figure 2A:
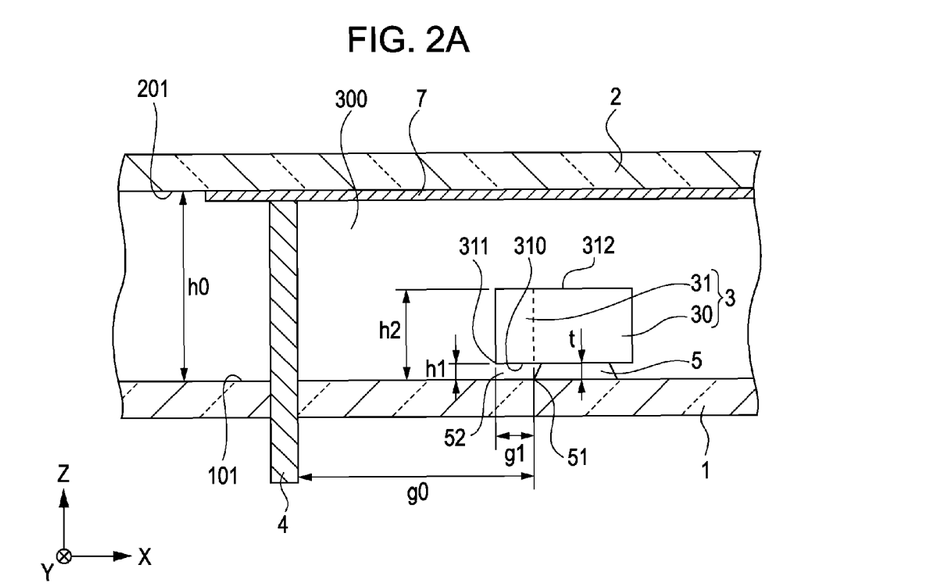
FIGS. 2A and 2B are cross-sectional views schematically illustrating display panels according to embodiments of the present invention.
Figure 2B:
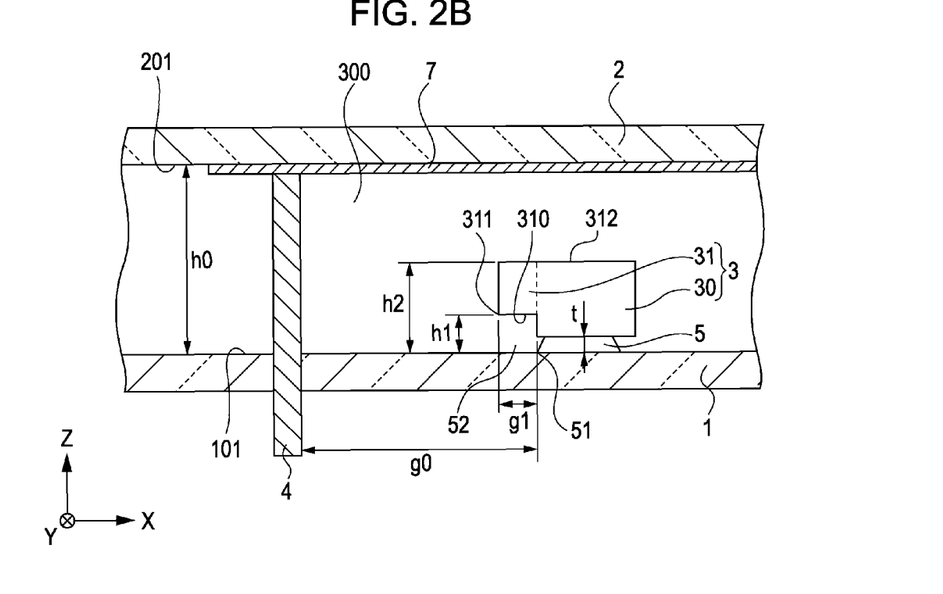
Figure 3A:
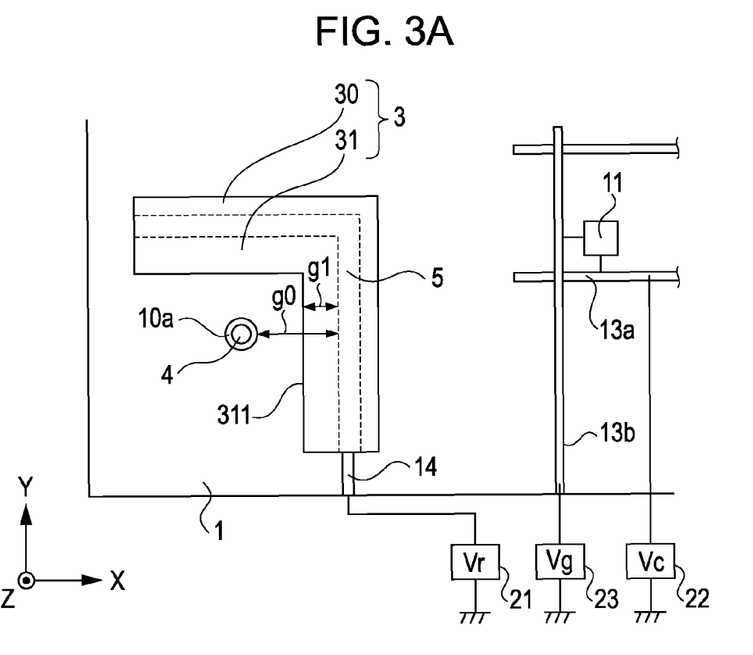
FIGS. 3A and 3B are plan views schematically illustrating display panels according to embodiments of the present invention.
Figure 3B:
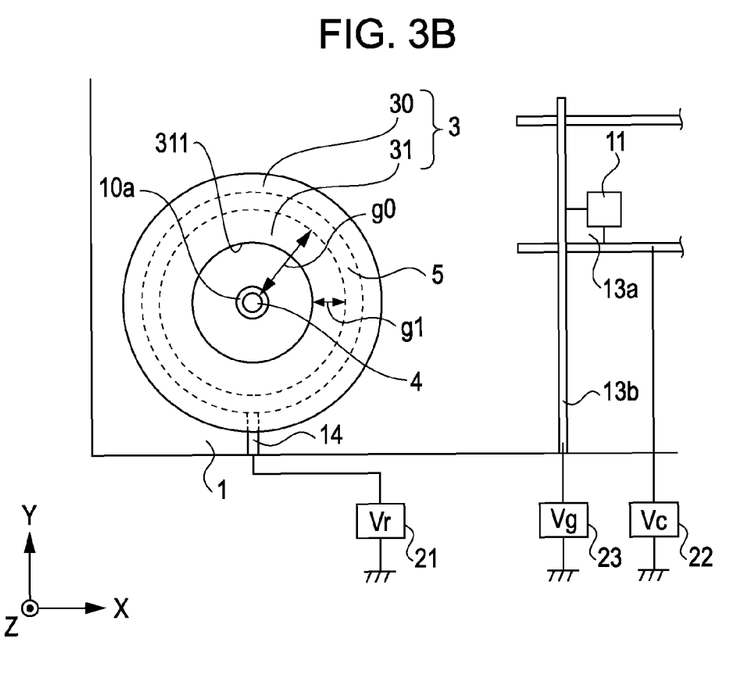

FIGS. 2A and 2B are schematic diagrams illustrating the details of the characteristic configuration of the part according to present embodiment of the invention. More specifically, FIGS. 2A and 2B are cross-sectional views taken in the X-Z plane and they illustrate, in an enlarged fashion, a part located away from the anode terminal 4 shown in FIG. 1B toward the display area (in a positive X direction). Note that the lead-in part 10 is not shown in FIGS. 2A and 2B. FIGS. 3A and 3B are X-Y plan views schematically illustrating the anode terminal 4 of the rear plate 100 and its surroundings (in a corner of the rear plate 100) as viewed from the side of the face plate 200.

The conductive member 5 is disposed at least between the electron emission device 11 and the anode terminal 4 such that the conductive member 5 is separated apart from the electron emission device 11. More specifically, the conductive member 5 is disposed at least between wiring 13 and the anode terminal 4 such that the conductive member 5 is separated apart from the wirings 13 (13a and 13b). In a case where there are provided a plurality of electron emission devices 11 and a plurality of wirings 13, the conductive member 5 may be disposed between the anode terminal 4 and both an electron emission device 11 and a wiring 13 that are located closest to the anode terminal 4. In the examples shown in FIGS. 1B, 3A, and 3B, nothing is disposed between the conductive member 5 and the electron emission device 11 and the wiring 13b. Alternatively, a member such as a spacer other than the electron emission device 11 and the wiring 13 may be disposed, or a wiring that is not connected to the electron emission device 11 may be disposed. The conductive member 5 is located also apart from the anode terminal 4. That is, the conductive member 5 is separated apart from any of the electron emission device 11, the wiring 13, and the anode terminal 4. More specifically, as shown in FIGS. 2A and 2B, the edge 51 of the conductive member 5, which is an edge facing the anode terminal 4, is located spaced apart from the edge (the edge facing the conductive member 5) of the anode terminal 4 by a distance (g0>0) in the X direction. The conductive member 5 has a height (thickness) t as measured from the surface 101 of the first substrate 1. In the display panel 1000, a practical range of the distance g0 is from 1.0 mm to 5.0 mm.

As shown in FIGS. 3A and 3B, the conductive member 5 has a lead portion 14. The conductive member 5 is applied with a prescribed potential Vr supplied, via the lead portion 14, by the prescribed potential unit 21 disposed in the display apparatus. The prescribed potential Vr is set to be lower than the anode potential Va.

The conductive member 5 may be made of a conductive material having such a volume resistivity that allows the conductive member 5 to have an equipotential distribution over its entire surface when the conductive member 5 is subjected to the prescribed potential Vr via the lead portion 14. In this regard, a material (conductor) with a volume resistivity equal to or smaller than $10^{-6}$ Ωm may be used. More specifically, as for the material of the conductive member 5, a metal such as Cu, Ag, Au, Al, Ti, Pt, etc., an alloy of such metals, a compound such as ITO, ZnO, etc. may be employed. The conductive member 5 may be formed via a process including preparing a component (part) having the same shape as the final shape of the conductive member 5 and disposing this member on the surface 101 of the first substrate 1. Note that, as will be described in further detail later, the height (thickness), t, of the conductive member 5 may be set to be as small as allowed. Practically, the thickness t may be set to be smaller than 100 µm. To achieve such a small thickness, the conductive member 5 may be produced in the form of a thin conductive film on the surface 101 of the first substrate 1 by using, for example, vacuum evaporation, printing, plating, or other known methods. In one embodiment, the conductive member 5 may be formed using the same material as that of the wiring 13 formed on the first substrate 1 in the same processing step as that of producing the wiring 13. This method is beneficial in that the conductive member 5 can be easily produced. The lead portion 14 may be formed integrally with the conductive member 5 as a part of the conductive member 5, although the lead portion 14 may be formed as a different member.

Although in the example shown in FIG. 2A the conductive member 5 has a trapezoidal shape in cross section (in the X-Z plane), the conductive member 5 may be formed in other cross-sectional shapes such as a rectangle, a semiellipse, or the like. Although in the trapezoidal shape in the example shown in FIG. 2A, the edge 51, on the side facing the anode terminal 4, of the conductive member 5 is located on the surface 101 of the first substrate 1, the edge 51, on the side facing the anode terminal 4, of the conductive member 5 may be spaced apart from the surface 101 of the first substrate 1.

The conductive member 5 may be provided at least between the anode terminal 4 and both the electron emission device 11 and the wiring 13. The cross-sectional shape of the conductive member 5 as seen in the X-Y plane may be a combination of straight segments as in the example shown in FIG. 3A or a curved shape as in the example shown in FIG. 3B. Alternatively, as shown in FIG. 1B, the conductive member 5 may be formed to extend also between the anode terminal 4 and the frame member 9. In an embodiment, the conductive member 5 has a shape (such as a loop, a closed curve, or the like) that completely surrounds the anode terminal 4 without discontinuity. In this case, as shown in FIG. 3B, the conductive member 5 may be in the form of a ring (closed ring) having a smooth inner circumference.

Next, the insulating member 3 having a characteristic structure according to an embodiment of the present invention is explained below. As shown in FIGS. 2A and 2B, the insulating member 3 made of an insulating (dielectric) material is disposed between the conductive member 5 and the face plate 200 (and more specifically on the conductive member 5). The insulating member 3 is disposed such that the insulating member 3 is connected to the conductive member 5 (wherein the connection may be achieved by bonding, joining, abutting, contacting, etc.). More specifically, the insulating member 3 is connected to the conductive member 5 such that the insulating member 3 is in contact with the upper surface (on the side facing the face plate 200) of the conductive member 5.

The insulating member 3 is spaced apart from the anode terminal 4 and is located closer to the anode terminal 4 than the conductive member 5 is located. More specifically, an edge 311, on a side facing the anode terminal 4, of the insulating member 3 is located closer to the anode terminal 4 than the edge 51, on the side facing the anode terminal 4, of the conductive member 5 is located. In FIGS. 2A and 2B, the distance between the edge 311 of the insulating member 3 and the edge 51 of the conductive member 5 in an X direction is denoted by g1 (g0>g1>0). In other words, the insulating member 3 has a part 31 that is located closer to the anode terminal 4 than the edge 51, on the side facing the anode terminal 4, of the conductive member 5 is located. This part 31 protrudes in a direction toward the anode terminal 4 beyond the edge 51 of the conductive member 5, and thus hereinafter this part 31 will be referred to a protrusion (protrusion 31). Note that the total of the insulating member 3 includes the protrusion 31 and a part 30 extending from the edge 51 of the conductive member 5 in a direction away from the anode terminal 4.

There is a gap 52 formed between the protrusion 31 and the surface 101 of the first substrate 1. Note that the gap 52 is an empty space (gap) in vacuum. In FIGS. 2A and 2B, the distance between the protrusion 31 and the surface 101 of the first substrate 1 in a Z direction is denoted by h1 (h1>0). That is, the distance of gap 52 is h1. More specifically, the protrusion 31 has a surface 310 facing the surface 101 of the first substrate 1. In the examples shown in FIGS. 2A and 2B, the edge 311 of the insulating member 3 is coincident with an edge, on a side facing the anode terminal 4, of the surface 310. Although in the examples shown in FIGS. 2A and 2B, surface 310 is a flat surface parallel to the surface 101 of the first substrate 1, the surface 310 may not be parallel to the surface 101, and the surface 310 may be a curved surface. In such a case, the distance h1 is defined by a smallest distance between the protrusion 31 and the first substrate 1. The distance h1 between the first substrate 1 and the protrusion 31 may be in a range from 1 μm to 500 μm, and more practically in a range from 10 μm to 300 μm. The distance g1 may be practically set to be equal to or greater than 10 μm.

An edge, on a side facing the face plate 200, of the insulating member 3 is denoted by reference numeral 312. The height of the edge 312 as measured from the surface 101 of the first substrate 1 is denoted by h2 (h2>t>0). The distance between the surface 101 of the first substrate 1 and the surface 201 of the second substrate 2 is denoted by h0 (h0≧h2). In the display panel, a practical range of the distance h0 between the first substrate 1 and the second substrate 2 is from 0.5 mm to 5.0 mm.

As for the material of the insulating member 3, a material (insulating material) with a volume resistivity equal to or greater than $10^6$ Ωm may be used. The relative dielectric constant of the material may be in a range from 3 to 10. A specific example of the material is ceramic such as alumina, zirconia, glass, etc.

Figure 7A:
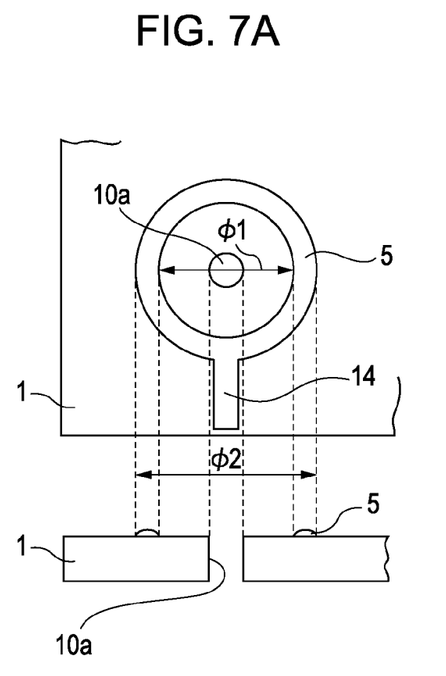
FIGS. 7A to 7C are schematic diagrams illustrating part of a method of producing a display panel according to an embodiment of the present invention.
Figure 7B:
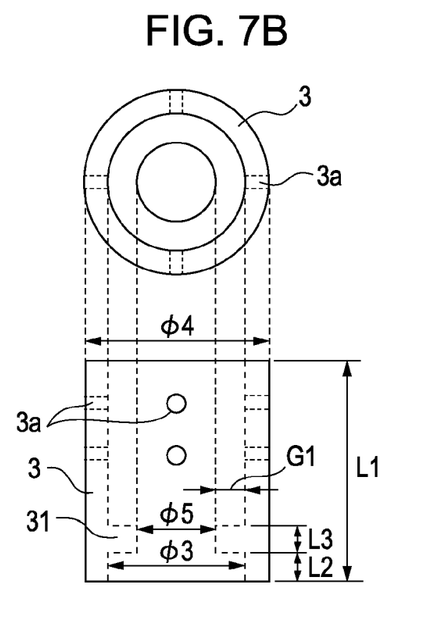
Figure 7C:
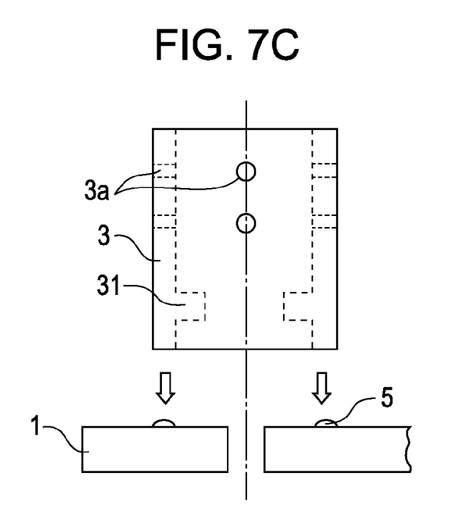

The insulating member 3 may be formed via a process including forming a sacrificial layer with a thickness of h1 corresponding to the shape of the gap 52 at a location closer to the anode terminal 4 than the conductive member 5 is located, then forming the insulating member 3 in the form of an insulating film on the conductive member 5 and the sacrificial layer, and finally, selectively removing the sacrificial layer. Alternatively, to easily and surely form the gap, the insulating member 3 may be formed via a process including forming the conductive member 5 on the first substrate 1 as shown in FIG. 7A, then preparing an insulating component (part) with a shape such as that shown in FIG. 7B, and finally placing the prepared insulating component on the conductive member 5 as shown in FIG. 7C. Note that as described above, the conductive member 5 may be formed in the shape of a conductive film.

Note that the insulating member 3 is disposed on the conductive member 5 such that at least the gap 52 is formed. The insulating member 3 may have such a shape in cross section in the X-Y plane that the insulating member 3 extends along the conductive member 5 as shown in FIG. 3A or 3B. In the example shown in FIG. 3B, the insulating member 3 extends in a ring (closed ring) form in cross section in the X-Y plane. The insulating member 3 having such a shape may be achieved by preparing a ring-shaped insulating part with a minimum inner diameter smaller than the inner diameter of the conductive member 5, and placing it on the conductive member 5. This process allows it to easily achieve the insulating member 3 having the protrusion 31.

Next, the protrusion 31 is explained in further detail below. In the present embodiment of the invention, the display apparatus includes at least the display panel 1000, the anode potential unit 20, and the prescribed potential unit 21. Note that in the present invention, it is assumed that the electric potential is defined with reference to the ground (GND) electric potential (0 V).

As shown in FIG. 1A, the anode potential unit 20 is electrically connected to the anode terminal 4 in the outer space. The anode potential unit 20 is a unit to provide the anode potential Va prescribed with respect to the GND potential. The anode potential Va generated by the anode potential unit 20 is applied to the anode terminal 4 so that the anode terminal 4 is subjected to the anode potential Va. More specifically, the anode potential unit 20 is an electric circuit (power supply circuit) configured to generate the anode potential Va. Typically, the anode potential unit 20 includes a transformer, a rectifier, and other elements thereby to generate the anode potential Va from a home AC power supply line (with a voltage of, for example, 100 V).

The display apparatus may include a driving circuit disposed in the outer space and configured to drive the electron emission device 11. The driving circuit includes a cathode potential unit 22 and a gate potential unit 23 shown in FIG. 3A or 3B. The cathode potential unit 22 and the gate potential unit 23 are units configured to provide the cathode potential Vc and the gate potential Vg, respectively, prescribed with reference to the GND potential. The cathode potential Vc and the gate potential Vg higher than the cathode potential Vc are applied to the electron emission device 11 via the wirings 13 (13a and 13b). In accordance with the driving voltage Vd that is equal to the difference between Vc and Vg, the electron emission device 11 emits electrons. Typically, the driving voltage Vd is smaller than or equal to 100 V. For example, the driving voltage Vd with a desired value can be obtained by setting Vc to a negative potential and Vg to a positive potential with respect to the ground potential. The driving circuit may include a scan driving circuit configured to output a scanning signal, and a modulation driving circuit configured to output a modulation signal. The driving circuit configured in such a manner may be used in the image display apparatus. More specifically, for example, the driving circuit may be configured such that the scan driving circuit includes the cathode potential unit 22 whereby the cathode potential Vc is given by the scanning signal, and the modulation driving circuit includes gate potential unit 23 whereby the gate potential Vd is given by the modulation signal. In the image display apparatus, an electron emission device 11 to be driven is selected by driving signals (the scanning signal and the modulation signal), and the driving voltage Vd is modulated so that a half-tone image is displayed on the display panel 1000.

The anode 8 is applied with the anode potential Va (or a voltage equal to the anode potential Va) that is generated by the anode potential unit 20 and supplied to the anode 8 via the anode terminal 4 and the connection electrode 7. The anode potential Va is set to be higher than the gate potential Vg. The electrons emitted by the electron emission device 11 are accelerated by the anode potential Va and collide with the light emitting material 12, which causes the light emitting material 12 to emit light. To emit light from the light emitting material 12, the anode potential Va is set in a range from 1 kV to 100 kV. In one embodiment, the anode potential Va may be set in a range from 5 kV to 30 kV, and moreover, in a range from 10 kV to 25 kV. That is, the display apparatus according to the present embodiment of the invention is configured to serve as an electron beam apparatus in which electrons are emitted from the electron emission device 11 and accelerated by an electric field formed by the anode 8 such that the accelerated electrons collide with the light emitting material 12 thereby to emit light by cathodeluminescence.

The display apparatus according to the present embodiment of the invention includes the prescribed potential unit 21. The lead portion 14 of the conductive member 5 is electrically connected to the prescribed potential unit 21 as shown in FIGS. 3A and 3B. The prescribed potential unit 21 is a unit configured to provide a prescribed potential Vr lower than the anode potential Va. The prescribed potential Vr generated by the prescribed potential unit 21 is applied to the conductive member 5 via the lead portion 14 such that the conductive member 5 is subjected to the prescribed potential Vr. The prescribed potential Vr may be set such that the absolute value thereof is smaller than or equal to the absolute value of the cathode potential Vc and the absolute value of the gate potential Vg. As for the prescribed potential unit 21, an electric circuit capable of generating a voltage Vr smaller than the anode potential Va may be employed.

In order to allow the display apparatus to be configured in a simplified form, the lead portion 14 may be connected to the driving circuit such that the prescribed potential Vr is given by the cathode potential Vc or the gate potential Vg. That is, by using the above-described driving circuit as the prescribed potential unit 21, it becomes unnecessary to provide an additional electric circuit serving as the prescribed potential unit 21, and thus it becomes possible to simplify the configuration of the display apparatus. However, if any chance a discharge occurs, a large current can flow through the driving circuit, which can damage the driving circuit. In view of the above, the prescribed potential Vr is to be set to equal to the ground potential (GND potential, reference potential, 0 V). More specifically, for example, a ground potential line of the display apparatus may be used as the prescribed potential unit 21. A conductive housing for supporting the display panel 1000 may be used to ground the lead portion 14 by electrically connecting the housing to the lead portion 14. By setting the prescribed potential Vr to be equal to the ground potential in the above-described manner, it is possible to easily set the prescribed potential Vr at an electric potential lower than the anode potential Va.

As with the conductive member 5, the guard electrode 6 is also set at an electric potential lower than the anode potential Va. In one embodiment, the guard electrode 6 may be set at the same electric potential as the prescribed potential Vr.

The setting of the anode terminal 4 at the anode potential Va causes an electric field to be formed around the anode terminal 4. The presence of the conductive member 5 causes the voltage between the electron emission device 11 and the anode terminal 4 to be equal to the electric potential Vr that is lower than the anode potential Va. This reduces the effect of the electric field formed around the anode terminal 4 on the electron emission from the electron emission device 11. On the other hand, between the anode terminal 4 and the conductive member 5, an electric field is formed depending on the anode potential Va, the prescribed potential Vr, and the distance g0.

Figure 4A:
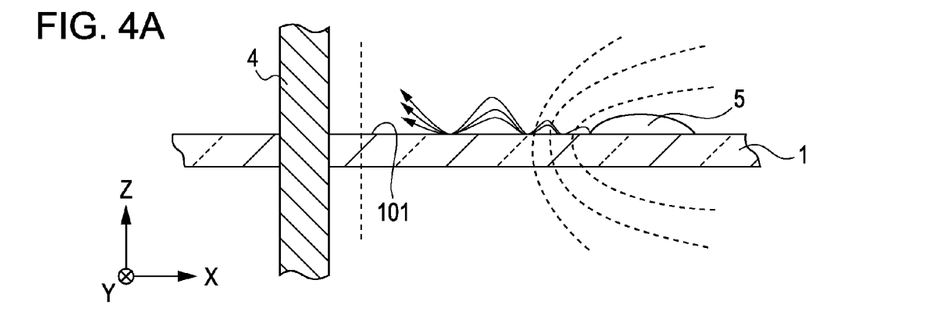
FIGS. 4A to 4C are diagrams for schematic explanations of embodiments of the present invention.
Figure 4B:
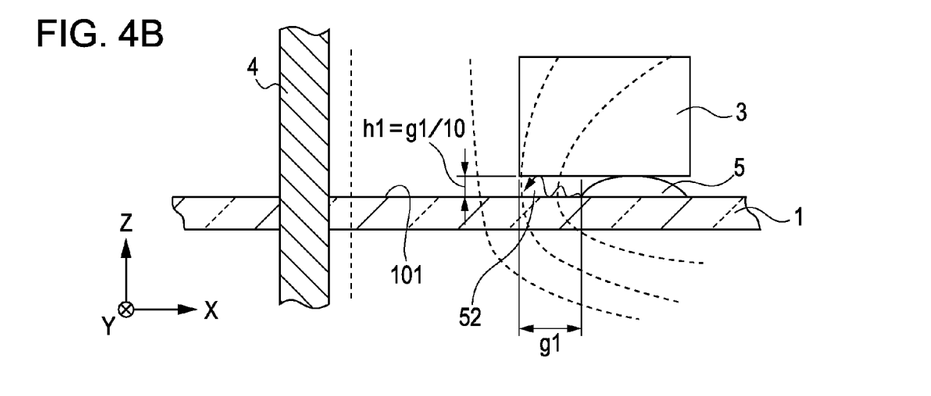

The present embodiment of the invention is described further with reference to FIGS. 4A and 4B illustrating a portion in the vicinity of the surface 101 of the first substrate 1. In FIGS. 4A and 4B, dashed lines are equipotential lines representing the electric field generated, in the vicinity of the surface 101 of the first substrate 1, by the potential difference between the prescribed potential Vr of the conductive member 5 and the anode potential Va of the anode terminal 4.

When the insulating member 3 is not present, as in the structure shown in FIG. 4A, an edge of an interfacial boundary between the first substrate 1 made of the insulating material and the conductive member 5 is located at a triple junction of the insulating material, the conductive material, and the vacuum, and thus the electric field is strong in the vicinity of this edge. The edge 51 of the conductive member 5 tends to be sharp in shape, which also causes the electric field to be strong in the vicinity of the edge 51. When the edge 51 of the conductive member 5 is located at the triple junction as in the example shown in FIG. 4A, a further increase occurs in the electric field.

The high electric field described above causes electrons to be emitted, by field emission, from the conductive member 5 as indicated by arrows in FIG. 4A. The emitted electrons (primary electrons) travel toward the anode terminal 4. During the travel, the electrons are multiple-scattered by the surface of the first substrate 1. The multiple scattering of the electrons causes electrons (secondary electrons) to be emitted in sequence from the surface of the first substrate 1. This phenomenon is called secondary electron avalanche. The secondary electron emission causes the surface of the first substrate 1 to be positively charged, which leads to a further increase in the electric field strength in the vicinity of the conductive member 5. Thus, a positive feedback occurs repeatedly, which finally causes a discharge (creeping discharge) to occur between the anode terminal 4 and the conductive member 5.

The present embodiment of the invention allows suppression of a discharge in the display panel 1000. This is because the presence of the gap 52 suppresses the discharge (creeping discharge) between the anode terminal 4 and the conductive member 5 even if electrons are emitted from the conductive member 5. More specifically, electrons (primary and/or secondary electrons) collide with the protrusion 31 as represented by arrows in FIG. 4B, and the collision leads to suppression of secondary electron avalanche and thus prevents the surface 101 of the first substrate 1 from being electrically charged. Note that because the protrusion 31 is spaced sufficiently apart from the anode terminal 4, there is little possibility that the collision of electrons with the protrusion 31 causes a creeping discharge to occur on the surface of the insulating member 3. Furthermore, the presence of the protrusion 31 creates a change in the electric field in the gap 52, which makes it difficult for electrons to go away from the gap 52 (that is, electrons are confined in the gap 52). On the other hand, in the case of the structure having no protrusion 31 and gap 52, once emission of electrons occurs, the positive feedback between the secondary electron avalanche and the electric charging occurs as described above, which can cause a discharge to occur.

Other structures are discussed below. Note that it is possible to employ any combination of these structures.

As shown in FIG. 2A, by placing the insulating member with a flat surface on the conductive member 5 with the thickness of t such that the flat surface of the insulating member is in contact with the conductive member 5, it is possible to obtain the gap 52 with a distance h1=t. In other words, the distance h1 of the gap 52 can be achieved by properly adjusting the height (thickness) t of the conductive member 5.

In one embodiment, the parameters may be set such that h1>t as shown in FIG. 2B. That is, the distance h1 between the part 31 of the insulating member 3 and the surface 101 of the first substrate 1 is to be set to greater than the height (thickness) of the conductive member 5 as measured with respect to the surface 101 of the first substrate 1. To make it possible to easily make comparison, the height h2 of the insulating member 3 is set to be equal for FIGS. 2A and 2B.

A further detailed explanation is given below. If the distance h1 of the gap 52 is set to be small, it is possible to suppress the discharge (creeping discharge) between the conductive member 5 and the anode terminal 4. However, the result of this is an increase in the probability that a discharge occurs between the protrusion 31 and the first substrate 1. Such a discharge can trigger a discharge to occur between the conductive member 5 and the anode terminal 4. In this regard, the distance h1 of the gap 52 is to be set to moderately great.

On the other hand, if the height t of the conductive member 5 is set to be great to achieve the distance h1, the result is that the equipotential lines created by the prescribed potential Vr move toward the face plate 200 (the connection electrode 7). As a result, an increase occurs in the electric field strength between the insulating member 3 and the connection electrode 7, which leads to an increase in the probability that a discharge occurs between the insulating member 3 and the connection electrode 7. In this regard, the height of the conductive member 5 is set to be as small as possible.

In view of the above, if the parameters are set such that h1>t, then the distance h1 can be obtained without increasing the height t of the conductive member 5 and without decreasing the distance h1 of the gap 52. The setting in the above-described manner also ensures that the gap 52 has the correct distance h1 even when the thickness t of the conductive member 5 is small. Therefore, it is possible to suppress not only the discharge (creeping discharge) between the anode terminal 4 and the conductive member 5 but also a discharge between the insulating member 3 and the first substrate 1 and/or a discharge between the insulating member 3 and the connection electrode 7.

More specifically, the condition h1>t can be easily achieved by preparing an insulating component (part) having a protrusion (corresponding to the protrusion 31) spaced apart from the surface that is to be brought into contact with the conductive member 5, and placing this component on the conductive member 5 such that the gap 52 is formed by the protrusion.

The distance h1 between the edge 311 of the insulating member 3 and the surface 101 of the first substrate 1 and the distance g1 between the edge 311 of the insulating member 3 and the edge 51 of the conductive member 5 may be determined so as to satisfy the following condition:

$$h1 \geq g1/10 \qquad (1)$$

More specifically, at a point distant away from the edge 51 of the conductive member 5 by a distance g in the X direction toward the anode terminal 4, the distance h between the surface of the insulating member 3 and the surface 101 of the first substrate 1 should satisfy the following condition:

$$h \geq g/10 \qquad (2)$$

Figure 4C:
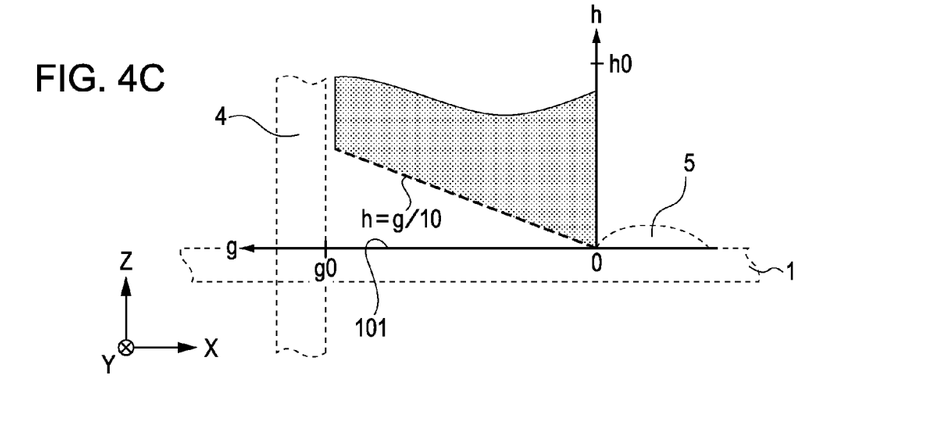

The condition represented in the form of inequality expression (2) is to be satisfied at any point between the conductive member 5 and the anode terminal 4, that is, for any g in the range of 0 to g0 (i.e., g0>g>0). Note that the upper limit of h is determined by g0 or h0. FIG. 4C illustrates the anode terminal 4, the conductive member 5, and the first substrate 1. In this figure, a long-dash line indicates where h=g/10 is satisfied for g measured from the edge 51 of the conductive member 5. In FIG. 4C, the condition (2) is satisfied when the insulating member 3 is located within a region (shaded in FIG. 4C) above the long-dash line and any part of the insulating member 3 does not exist below the long-dash line. That is, it is sufficient if the surface of the insulating member 3 is spaced apart from the first substrate 1 such that the surface of the insulating member 3 is located on or upwardly apart from the long-dash line represented by the inequality expression (2).

The inequality expression (2) is determined by a calculation such that when the insulating member 3 has the protrusion 31 (that is, g1>0 in FIG. 4B), the electric field in the vicinity (in the gap 52) of the edge 51 of the conductive member 5 is weaker than the electric field in the structure in which the insulating member 3 does not have the protrusion 31 (i.e., g1=0). In the calculation, the thickness t of the conductive member 5 is assumed to be equal to 0. In the structure in which there is no insulating member 3 as shown in FIG. 4A, the electric field in the vicinity of the edge 51 of the conductive•member 5 is stronger than the electric field in the structure in which the insulating member 3 having no protrusion 31 is provided (g1=0).

When the inequality expression (2) is satisfied, the presence of the insulating member 3 leads to a reduction in the strength of the electric field in the vicinity of the edge 51 of the conductive member 5. Furthermore, by weakening the electric field in the vicinity of the triple junction formed on the edge of the interfacial boundary between the conductive member 5 and the first substrate 1, it is possible to suppress the discharge. Note that the connection of the insulating member 3 to the conductive member 5 leads to a creation of a new triple junction on the edge of the interfacial boundary between the conductive member 5 and the insulating member 3. However, this new triple junction is located farther apart from the anode terminal 4 than the edge 51 of the conductive member 5 is far apart from the anode terminal 4, and thus the possibility is low that this triple junction causes a discharge. As described above, by providing the insulating member 3, it becomes possible to weaken the electric field in the vicinity of the edge 51 of the conductive member 5 and in the vicinity of the triple junction of the conductive member 5/insulator/vacuum.

If g1 is increased (that is, if the location of the protrusion 31 of the insulating member 3 is shifted to the anode terminal 4), the result is in an increase in the potential difference between the protrusion 31 and the first substrate 1, which leads to an increase in possibility that a discharge occurs between the insulating member 3 and the first substrate 1. The inequality expression (1) says that h1 should be greater for greater g1. Therefore, by setting parameters so as to satisfy the inequality expression (1), it is possible to weaken the electric field between the insulating member 3 and the first substrate 1 thereby achieving suppression of discharging.

Figure 5A:
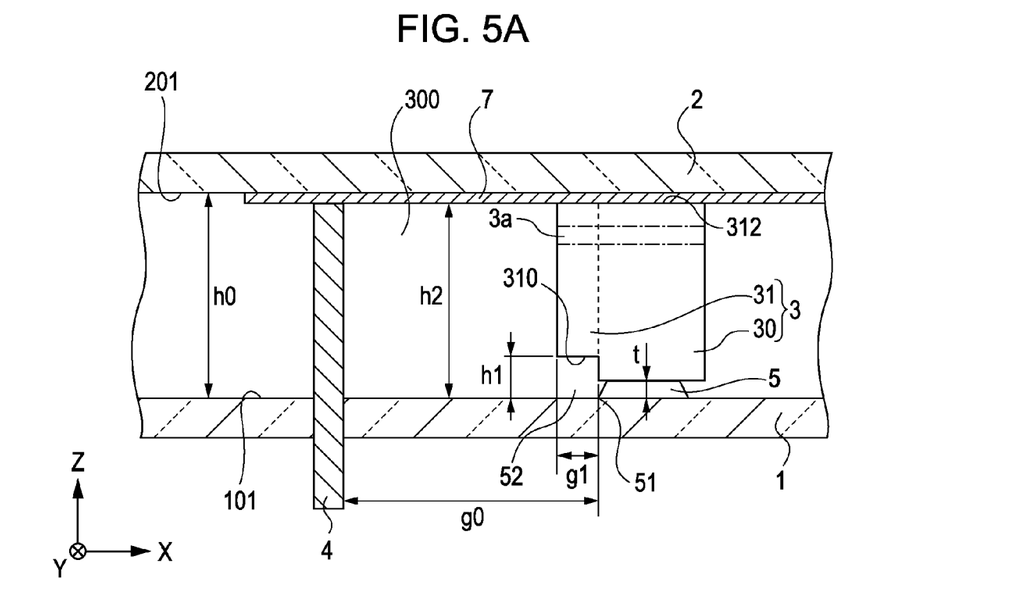
FIGS. 5A and 5B are cross-sectional views schematically illustrating display panels according to embodiments of the present invention.
Figure 5B:
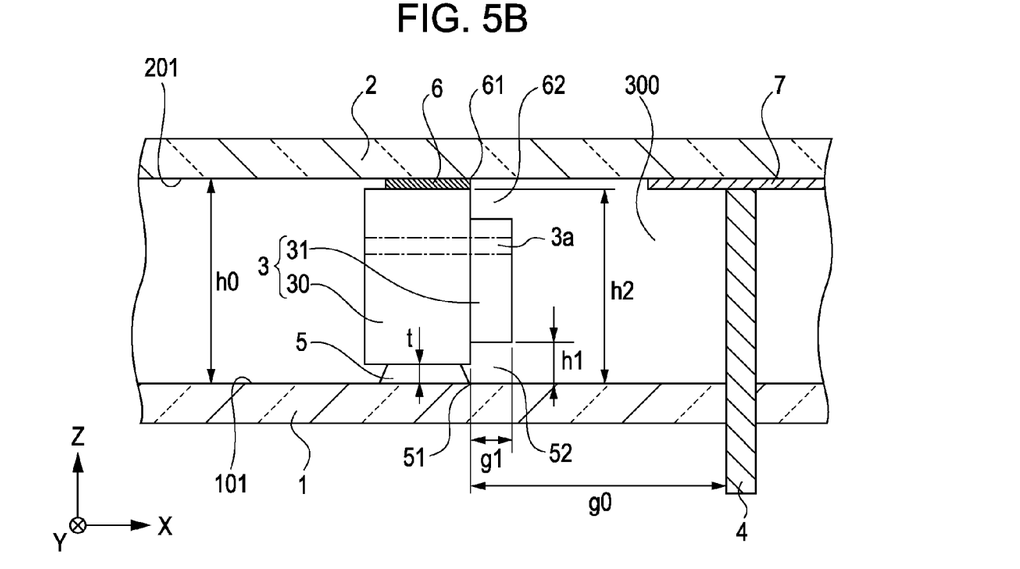

As shown in FIGS. 5A and 5B, the insulating member 3 may be connected to the face plate 200. The connection to the face plate 200 may be achieved by connecting a member (such as the second substrate 2, the connection electrode 7, the anode 8, the guard electrode 6, etc.) of the face plate 200 to the insulating member 3. The connection may be achieved by various methods such as bonding, joining, abutting, contacting, etc. Furthermore, of members of the face plate 200, a member (the connection electrode 7 or the anode 8) that is subjected to the anode potential Va may be connected to the insulating member 3.

A further detailed explanation is given below. The electric potential of the edge 312 (facing the face plate 200) of the insulating member 3 is determined by the difference between the electric potential Va of the connection electrode 7 and the electric potential Vr of the conductive member 5. In a case where the insulating member 3 is an ideal insulator (i.e., the electric conductivity thereof is 0), the electric potential of the edge 312 of the insulating member 3 is determined by the dielectric constant of the inner space 300, the dielectric constant of the insulating member 3, and the lengths thereof in the Z direction.

However, in practice, the material of the insulating member 3 has some electric conductivity. Therefore, in the structure in which insulating member 3 is not in contact with the face plate 200 as in the examples shown in FIGS. 2A and 2B, the electric potential of the edge 312 of the insulating member 3 is closer to the electric potential Vr of the conductive member 5 than the electric potential calculated by assuming that the electric conductivity of the insulating member 3 is equal to 0. In particular, if h2 is increased to achieve desired h1, the electric field between the edge 312 of the insulating member 3 and the connection electrode 7 increases, which leads to an increase in probability that a discharge occurs between the insulating member 3 and the connection electrode 7.

The situation described above can be avoided by connecting the insulating member 3 to the connection electrode 7 thereby preventing a large potential difference from occurring between the insulating member 3 and the connection electrode 7 and thus preventing a strong electric field from occurring. This makes it possible to suppress the discharge between the connection electrode 7 and the insulating member 3.

In an embodiment, as shown in FIG. 5B, the insulating member 3 is connected to the guard electrode 6 such that the insulating member 3 has a part located closer to the anode 8 than the edge 61 (facing the anode 8 (the connection electrode 7)) of the guard electrode 6 is located. In this structure, a gap 62 may be formed between the surface 201 of the second substrate 2 and the part of the insulating member 3 located closer to the anode 8 than the edge 61 of the guard electrode 6 is located. This allows suppression of the discharge between the guard electrode 6 and the connection electrode 7 (anode 8) in a similar manner to the suppression of the discharge between the conductive member 5 and the anode terminal 4. The distance of the gap 62 may be set to be equal to the thickness of the guard electrode 6 as in the structure shown in FIG. 2A. In one embodiment, the distance of the gap 62 be greater than the thickness of the guard electrode 6 as in the structure shown in FIG. 2B. More specifically, the protrusion 31 forms the gap 52 between the protrusion 31 and the first substrate 1 and the gap 62 between the protrusion 31 and the second substrate 2 as shown in FIG. 5B.

The insulating member 3 may be formed in the shape of a loop (closed curve), and moreover, may be in the shape of a ring (closed ring) as shown in FIG. 3B. This configuration makes it possible to suppress the discharge in any direction between the anode terminal 4 and other elements, such as the electron emission devices 11, the frame member 9, etc., disposed around the anode terminal 4. With regard to the structure in the Z direction, this insulating member 3 may be connected to the face plate 200 as shown in FIGS. 5A and 5B.

In this configuration, a through-hole 3a may be formed in the insulating member 3 as shown in FIGS. 5A and 5B. The through-hole 3a may not be provided, but the through-hole 3a provides the following benefit. That is, the through-hole 3a allows a space on the inner side of the insulating member 3 (i.e., the space on the side facing the anode terminal 4) to communicate with a space on the outer side of the insulating member 3 (i.e., the space on the side opposite to the anode terminal 4). This makes it possible to achieve the same ambient (with the same degree of vacuum) for both spaces in the inside and outside of the insulating member 3. If the degree of vacuum decreases (i.e., if the pressure increases) in the inside of the insulating member 3 where the lead-in part 10 is located, the inside of the insulating member 3 is immediately evacuated via the through-hole 3a, and thus it is possible to suppress a discharge that can occur due to the reduction in the degree of vacuum. The presence of the through-hole 3a is also beneficial in that when the inner space 300 is evacuated into vacuum, the space inside the insulating member 3 can be easily and properly evacuated.

Figure 6A:
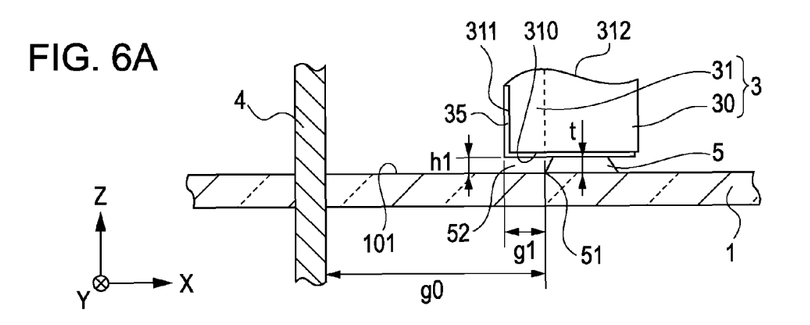
FIGS. 6A to 6C are cross-sectional views schematically illustrating display panels according to embodiments of the present invention.
Figure 6B:
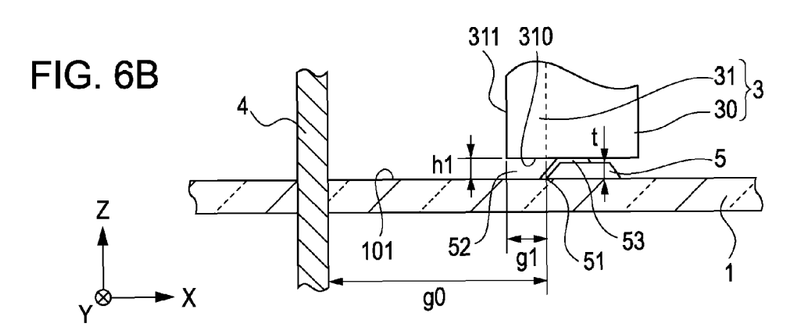
Figure 6C:
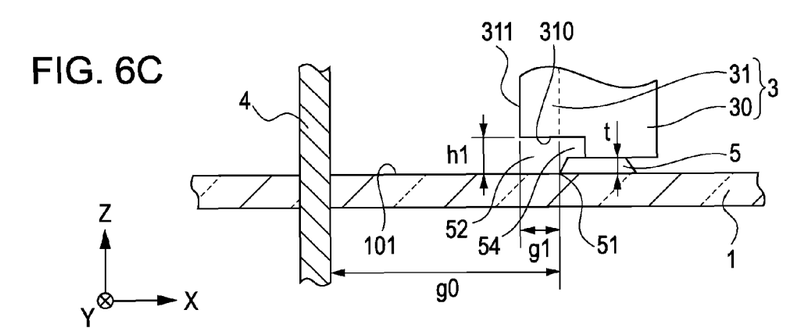

FIGS. 6A to 6C illustrate examples of structures in the vicinity of the surface 101 of the first substrate 1 shown in FIGS. 2A and 2B. Note that other elements are not shown in these figures.

FIG. 6A illustrates an example in which an antistatic film 35 with a sheet resistance of $10^7$ Ω/square to $10^{14}$ Ω/square is formed on the surface of the insulating member 3 such that when the insulating member 3 is impacted by electrons emitted in the gap 52, the antistatic film 35 prevents the insulating member 3 from being electrically charged.

FIG. 6B illustrates an example in which the edge 51 of the conductive member 5, which is located on the side facing the anode terminal 4, is covered with an insulating film 53 thereby to prevent electrons from emitting from the conductive member 5. In this configuration, the protrusion 31 is formed such that the gap 52 is formed so as to be located closer to the anode terminal 4 than the edge (facing the anode terminal 4) of the insulating film 53 is located. Even if electrons emitted from the conductive member 5 pass through the insulating film 53 or even if electrons are emitted from the insulating film 53 itself, the gap 52 causes the emitted or newly generated electrons to lose their energy, and thus it is possible to suppress an occurrence of a discharge. Furthermore, even if the insulating film 53 has a coverage defect, the presence of the gap 52 suppresses an occurrence of a discharge. The insulating member 3 may be bonded to the conductive member 5 using an insulating adhesive such that this insulating adhesive functions as the insulating film 53.

FIG. 6C illustrates an example in which a part of the insulating member 3 other than the protrusion 31 is located so as to face the conductive member 5 via a gap (a sub-gap 54). Note that the sub-gap 54 is continuation of the gap 52. The formation of the gap 54 results in shifting the location of the triple junction formed at the edge (facing the anode terminal 4) of the interfacial boundary between the conductive member 5 and the insulating member 3 in a direction away from the anode terminal 4. That is, the presence of the gap 52 and the sub-gap 54 suppresses a discharge from the triple junction.

The display panel 1000 according to any embodiment of the present invention can be used in a television apparatus. A block diagram illustrating an example of a configuration of a television apparatus may be found, for example, in Japanese Patent Laid-Open No. 2006-011286 or Japanese Patent Laid-Open No. 2005-203348.

The television apparatus may include a receiving circuit, an I/F unit, and an image display apparatus. The image display apparatus may include a control circuit, a driving circuit, the anode potential unit 20, the prescribed potential unit 21, and the display panel 1000. The driving circuit of the image display apparatus may include a scan driving circuit and a modulation driving circuit as described above.

The receiving circuit is configured to receive a television signal including image information. The television signal may be received from a broadcast system such as a satellite broadcast, a terrestrial broadcast, a CATV, etc., a communication system such as the Internet, a video conference system, etc., an image input apparatus such as a camera, scanner, etc., an image storage apparatus in which images are stored, etc. The receiving circuit may include a tuner and/or a decoder. The receiving circuit operates so as to produce image data by decoding the television signal and output the resultant image data to the I/F unit.

The I/F unit converts the image data into a display format employed by the image display apparatus and output the resultant image data (image signal) to the image display apparatus. The control circuit performs image processing, such as a correction process adapted to the display panel 1000, on the input image signal, and outputs the resultant image signal together with various control signals to the driving circuit. In accordance with the supplied image signal, the driving circuit outputs a driving signal to the display panel 1000. As a result, an image corresponding to the television signal is displayed on the display panel 1000. Thus, the present embodiment of the present invention makes it possible to achieve a high-reliability television apparatus using the display panel 1000 in which occurrence of discharge is suppressed.

EXAMPLES

The present invention is described in further detail below with reference to specific examples.

Example 1

A transparent glass substrate serving as the second substrate 2 was prepared. A conductive black member (black matrix) having openings in which light emitting materials 12 are to be disposed was formed on the glass substrate 2. Photosensitive carbon black was used as the material of the conductive black member, and the thickness of the black member was set to 10 μm.

An exposing and patterning process was then performed to form openings in the photosensitive carbon black, and phosphors of R, G, and B colors serving as the light emitting materials 12 were filled in the openings in the photosensitive black member. More specifically, using a screen printing process, phosphors of three colors, i.e., R, G, and B colors with a thickness of 10 μm were filled in the openings of the conductive black member.

To form the anode 8, an aluminum film was deposited to a thickness of 100 nm over the entire surface of the conductive black member and the phosphors by using an evaporation method.

Via the process described above, the face plate 200 including the black matrix, the anode 8, and the light emitting materials 12 disposed on the glass substrate 2 was obtained.

Next, a glass substrate serving as the first substrate 1 was prepared. A through-hole 10a with a diameter of 1.0 mm was formed at a location close to a corner of the glass substrate 1. Wirings 13 extending in the form of a matrix were then formed on the glass substrate 1 by a screen printing process using Ag paste.

Furthermore, a screen printing process using Ag paste was performed to form the conductive member 5 in the form of a ring with a thickness of 10 μm, an inner diameter (minimum inner diameter) $\phi1$ of 4.0 mm, and an outer diameter $\phi2$ of 6.0 mm such that the through-hole 10a was surrounded by the conductive member 5. The lead portion 14 was also formed at the same time as the conductive member 5. FIG. 7A illustrates a top view and a side view (cross-sectional view) of the glass substrate 1 in this state. Note that the wirings 13 extending in the form of a matrix are not shown in FIG. 7A, although they were already formed on the glass substrate 1 in an area that is not shown in FIG. 7A. A plurality of surface-conduction electron emission devices 11 were formed on the glass substrate 1 by using a known method. Note that the conductive member 5 may be formed after the formation of the electron emission devices 11. Via the process described above, the rear plate 100 including the surface-conduction electron emission devices 11 and the matrix wirings 13 formed on the glass substrate 1 was obtained.

Next, an alumina component 3 (serving as the insulating member 3) was prepared. FIG. 7B illustrates a top view and a side view (cross-sectional view) of the component 3.

The prepared component 3 was in the form of a ring having an inner diameter $\phi3$ of 4.0 mm at its one end (that was to be connected to the conductive member 5) and at the other end, and an outer diameter $\phi4$ of 6.0 mm. The length (L1) from the one end to the other end of the component 3 was set to 1.6 mm so as to fit the spatial distance between the first substrate 1 and the second substrate 2. The component 3 was formed so as to have the protrusion 31 protruding inwardly by 0.1 mm (G1) from the inner wall of the component 3 along the inner circumference with a width (L3) of 0.1 mm one end of which was located at a position (L2) inwardly shifted by 0.1 mm from the end of the ring and the other end of which was located at a position inwardly shifted by 0.2 mm from the end of the ring. That is, the minimum inner diameter $\phi5$ of the component 3 was 3.8 mm. The through-hole 3a shown in FIG. 7B was not formed.

As shown in FIG. 7C, the above-described ring-shaped component 3 was placed on the conductive member 5 such that the inner wall at the one end of the component 3 was concentrically coincident with the inner edge of the conductive member 5 formed on the glass substrate 1 described above. In FIG. 7C, a dashed-dotted line indicates a center axis of coaxial circles. The conductive member 5 and the component 3 were bonded together using a thermosetting insulating inorganic adhesive including silica coated along outer circumferences of the conductive member 5 and the one end of the component 3.

Next, a spacer in the form of a plate for defining the distance between the rear plate 100 and the face plate 200 was prepared. The rear plate 100 and the face plate 200 were placed such that they were spaced apart by the spacer from each other by a distance of 1.6 mm, and the rear plate 100 and the face plate 200 were bonded together via the frame member 9. The bonding portions thereof were airtightly sealed using a low-melting-point metal.

The anode terminal 4 was put into the through-hole 10a such that the anode terminal 4 was inserted in the inside of the airtight enclosure until the anode terminal 4 was brought in contact with the anode 8. The anode terminal 4 was then bonded to the glass substrate 1 using a low-melting-point glass paste 10b such that the through-hole 10a was also airtightly sealed by the low-melting-point glass paste 10b. Note that 426 alloy having a similar thermal expansion coefficient to that of the substrate (glass) was used as the material of the anode terminal 4 from the point of view that similar thermal expansion coefficients of the anode terminal 4 and the substrate allow a high mechanical strength. Note that the insertion and bonding of the anode terminal 4 may be performed before the rear plate 100 and the face plate 200 are combined together via the frame member 9, or before the component 3 is mounted.

The inside of the airtight enclosure produced via the above-described process was then evacuated via an exhaust hole formed in the airtight enclosure. After the evacuation, the exhaust hole was sealed so that the inner space 300 was maintained under vacuum. Thus, the display panel 1000 was obtained. The display apparatus was then produced by connecting a power supply capable of generating a voltage higher than 10 kV to the anode terminal 4 of the display panel 1000.

The display apparatus produced in the above-described manner was evaluated in terms of discharging by supplying the anode potential to the anode terminal 4 from the anode potential unit 20 while the conductive member 5 and the wirings 13 were maintained at the GND potential. The anode potential was set to 12 kV. No discharge was observed during a one-hour test. The anode potential was then gradually increased. No discharge occurred until the anode potential reached 20 kV.

Example 2

In Example 2, a display apparatus was produced in a similar manner to Example 1 except that the size of the component 3 shown in FIG. 7B was different, and thus a duplicated explanation thereof is omitted.

In Example 2, as in Example 1, the component 3 was produced in the form of a ring having an inner diameter $\phi3$ of 4.0 mm at its one end (that was to be connected to the conductive member 5) and at the other end, and an outer diameter φ4 of 6.0 mm. The length L1 of the component 3 was set to 1.6 mm so as to fit the distance between the first substrate 1 and the second substrate 2. The component 3 was formed so as to have the protrusion 31 protruding by 0.1 mm (G1) from the inner wall of the component 3 along the inner circumference with a width (L3) of 0.1 mm one end of which was located at a position (L2) inwardly shifted by 0.05 mm from the end of the ring and the other end of which was located at a position inwardly shifted by 0.15 mm from the end of the ring. That is, the minimum inner diameter φ5 of the component 3 was 3.8 mm. The through-hole 3a shown in FIG. 7B was not formed.

The display apparatus including the component 3 produced in the above-described manner was evaluated in terms of discharging. 12 kV was applied as the anode potential. No discharge was observed during a one-hour test. The anode potential was then gradually increased. No discharge occurred until the anode potential reached 22 kV.

Example 3

In Example 3, a display apparatus was produced in a similar manner to Example 1 except that through-holes 3a were formed in the component 3, and thus a duplicated explanation thereof is omitted. In Example 3, a plurality of through-holes 3a was formed in the wall of the insulating member 3 used in Example 1. Note that the through-holes 3a were formed at positions shifted from the protrusion 31 toward the other end.

The display apparatus including the component 3 produced in the above-described manner was evaluated in terms of discharging. 12 kV was applied as the anode potential. No discharge was observed during a one-hour test. 20 kV was then applied as the anode potential, and no discharge was observed during a one-hour test. The anode potential was then gradually increased. No discharge occurred until the anode potential reached 21 kV.

Example 4

In Example 4, a display apparatus was produced in a similar manner to Example 1 except that the size of the component 3 was different, and thus a duplicated explanation thereof is omitted.

In Example 4, as in Example 1, the component 3 was produced in the form of a ring having an inner diameter φ3 of 4.0 mm at its one end (that was to be connected to the conductive member 5) and at the other end, and an outer diameter φ4 of 6.0 mm. The length L1 of the component 3 was set to 0.3 mm. The component 3 was formed so as to have the protrusion 31 protruding by 0.1 mm (G1) from the inner wall of the component 3 along the inner circumference with a width (L3) of 0.1 mm one end of which was located at a position (L2) inwardly shifted by 0.05 mm from the end of the ring and the other end of which was located at a position inwardly shifted by 0.15 mm from the end of the ring. That is, the minimum inner diameter φ5 of the component 3 was 3.8 mm. The through-hole 3a shown in FIG. 7B was not formed.

The display apparatus including the component 3 produced in the above-described manner was evaluated in terms of discharging. 12 kV was applied as the anode potential. No discharge was observed during a one-hour test. The anode potential was then gradually increased. No discharge occurred until the anode potential reached 19 kV.

Comparative Example

As a comparative example, a display panel was produced in a similar manner to the above examples except that the insulating member 3 was formed in the shape of a ring whose inner wall was flat without having the protrusion 31, and the produced display panel was evaluated in terms of discharging. 12 kV was applied as the anode potential. No discharge was observed during a one-hour test. The anode potential was gradually increased thereafter. When the anode potential reached 16 kV, a discharge occurred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-111124 filed Apr. 30, 2009 which is hereby incorporated by reference herein in its entirety.

What is claimed is:

1. A display panel comprising:
    a rear plate including a first insulating substrate having a backward internal surface, an electron emission device and a wiring connected to the electron emission device, both of which are disposed on the backward internal surface;
    a face plate including a second insulating substrate having a forward internal surface and an anode that is disposed on the forward internal surface so as to oppose the electron emission device;
    an anode terminal extending through the first insulating substrate and electrically connected to the anode, wherein the anode terminal is subjected to an anode potential;
    a conductive member disposed on the first insulating substrate between the anode terminal and both of the electron emission device and the wiring such that the conductive member is spaced apart from the electron emission device, the wiring and the anode terminal, wherein the conductive member is subjected to a prescribed potential lower than the anode potential; and
    an insulating member located between the forward internal surface and the conductive member, being spaced apart from the anode terminal and disposed on the conductive member,
    wherein the insulating member includes a part located closer to the anode terminal than the conductive member, and the part and the backward internal surface are disposed with a gap in between.

2. The display panel according to claim 1, wherein a distance between the backward internal surface and the part is greater than a thickness of the conductive member.

3. The display panel according to claim 1, wherein a distance h, between the first insulating substrate and the insulating member as measured at a point distant away by a distance g from the conductive member toward the anode terminal satisfies a condition $h \geq g/10$.

4. The display panel according to claim 1, wherein the conductive member and the insulating member are formed in a shape of a ring surrounding the anode terminal.

5. The display panel according to claim 1, wherein the insulating member is connected to the face plate.

6. The display panel according to claim 1, wherein the insulating member and the conductive member is disposed with a gap, which continues to the gap between the insulating member and the first insulating substrate.

7. The display panel according to claim 1, wherein an antistatic film with a sheet resistance of $10^7$ Ω/square to $10^{14}$ Ω/square is formed on a surface of the part.

8. The display panel according to claim 1, wherein the conductive member has an edge facing to a side surface of the anode terminal and wherein the edge is covered with an insulating film.

9. The display panel according to claim 1, wherein:
the face plate includes an electrode disposed on the second insulating substrate at a location spaced apart from the anode, wherein the electrode is subjected to a potential lower than the anode potential; and
the insulating member is connected to the electrode, and the insulating member includes a part which is located closer to the anode than the electrode and, the second insulating substrate and the part located closer to the anode than the electrode, are disposed with a gap in between.

10. The display panel according to claim 1, wherein:
the conductive member and the insulating member are in shape of rings surrounding the anode terminal, and the insulating member is connected to the face plate, and
a through-hole is provided in the insulating member such that a space located on a side, closer to the anode terminal, of the insulating member communicates via the through-hole with a space located on the opposite side of the insulating member.

11. A display apparatus comprising:
the display panel according to claim 1;
an anode potential unit connected to the anode terminal, the anode unit being configured to supply the anode potential;
a prescribed potential unit connected to the conductive member, the prescribed potential unit being configured to supply the prescribed potential lower than the anode potential; and
a driving circuit connected to the wiring, the driving circuit being configured to drive the electron emission device.

12. A television apparatus comprising:
a receiving circuit configured to receive a television signal; and
a display panel configured to display an image in accordance with the television signal,
wherein the display panel is the display panel according to claim 1.

13. A method of producing a display panel according to claim 1, comprising:
providing the conductive member by forming a conductive film on a first insulating substrate; and
providing the insulating member by placing an insulating component prepared in advance, on the conductive member.

14. The method according to claim 13, wherein:
the conductive film is formed in a shape of a ring, and
the insulating component is prepared with a shape of a ring having a minimum inner diameter smaller than a minimum inner diameter of the conductive member.

* * * * *